Aug. 31, 1943.                J. D. SEGUY                 2,328,234
              PROCESS FOR REACTIVATING USED CATALYSTS
                       Filed Aug. 15, 1940
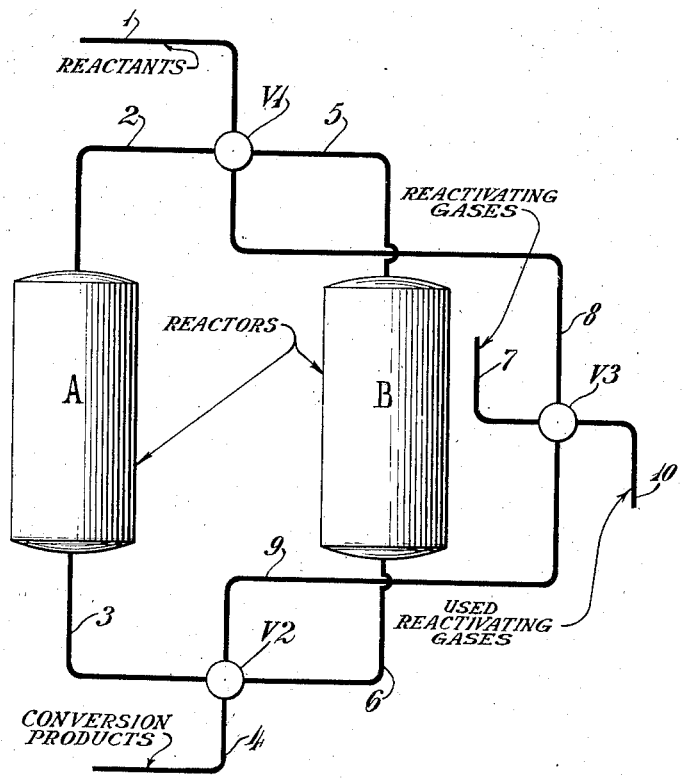
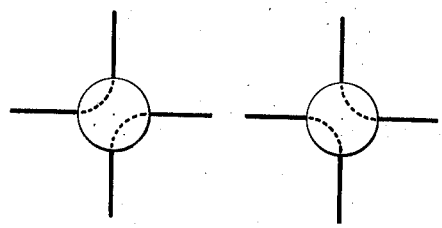
INVENTOR.
Jean Delattre Seguy
BY
Lee J. Gay
        Attorney.

Patented Aug. 31, 1943

2,328,234

UNITED STATES PATENT OFFICE 2,328,234

PROCESS FOR REACTIVATING USED CATALYSTS

Jean Delattre Seguy, Chicago, Ill., assignor to Universal Oil Products Company, Chicago, Ill., a corporation of Delaware Application August 15, 1940, Serial No. 352,681

3 Claims. (Cl. 196—52)

This invention relates to improvements in the method of reactivating spent catalyst masses upon which carbonaceous substances have deposited during a prior processing period and more specifically to a method of reactivation whereby the temperature of the catalyst mass after reactivation is substantially uniform throughout.

In the reactivation of spent catalyst masses to remove carbonaceous substances which have deposited thereon during use in conversion of hydrocarbons, it is generally found that combustion of these carbonaceous substances, particularly in relatively deep beds of catalytic material, will not take place throughout the entire bed at one time, but instead a relatively shallow burning zone passes through the bed of catalytic material from inlet to outlet so that combustion is taking place in only a relatively small portion of the catalyst bed in any given time. As a result thereof, if one is employing a relatively low temperature on the inlet stream of reactivating gases the uppermost portions of the catalyst bed or inlet end may be cooled to substantially the temperature of the fresh reactivating gas stream while the lower or outlet portions of the catalyst bed will be at the higher peak reactivating temperatures. When reactivation is completed then as evidenced by a decline in the peak reactivating temperature, one part of the catalyst bed will be left at the peak temperature of reactivation while the other part thereof will be at a temperature substantially equal to the inlet of the reactivating gas stream, and I have found that the temperature difference existing between the inlet and outlet of the catalyst bed may range from 100 to 200° F. or more.

After completing reactivation, in the manner above described, when hydrocarbon reactants are supplied to the freshly reactivated bed of catalytic material, it is apparent that conversion in the lower portion or at the outlet of the catalyst bed will in a large extent be due to thermal effects rather than the contemplated catalytic effect.

In view of the above, after reactivation has been completed, my invention provides for reversing the direction of the flow of reactivating gases so that heat that has accumulated at the lower or outlet end of the catalyst bed may be dispersed through the rest of the catalyst bed whereby the inlet and outlet portions thereof are brought to substantially the same temperature. In such cases, it is entirely probable that the hydrocarbon reactants may be supplied to the freshly reactivated catalytic material at a lower inlet temperature, due to the fact that no preheating of the catalyst bed by hydrocarbon reactants would be necessary, as is usually the case in processes employing the usual method of reactivation, because in my process the temperature in substantially all portions of the catalyst bed may be so controlled that it is substantially equal to the most desirable conversion temperature.

In one specific embodiment the invention comprises passing a stream of heated oxygen-containing reactivating gases in contact with a bed of catalytic material to remove therefrom carbonaceous substances deposited during a prior processing period, reversing the direction of flow of said reactivating gases after reactivation is substantially completed as evidenced by a drop in temperature to disperse the heat accumulated at the outlet of said catalyst bed so that said catalyst bed is brought to a substantially uniform temperature throughout before hydrocarbon reactants are passed in contact therewith.

One specific method of accomplishing the objects of the invention will be described while referring to the accompanying drawing, wherein, Fig. 1 is a diagrammatic illustration in conventional side elevation of the apparatus which may be employed, while Figs. 2 and 2A are illustrations of four-way switching valves indicated as VI, V2, and V3 in Fig. 1.

The invention is not limited with respect to any specific type of catalytic reaction but may find greater applicability in catalytic processes wherein the conversion reaction is endothermic such as, for example, catalytic cracking, dehydrogenation, cyclization, etc. However, for the purpose of illustration the description which follows will be limited to the use of the invention in a catalytic cracking process employing any of the well known types of catalytic material.

Referring now to Fig. 1, the apparatus is shown as consisting of two reactors A and B which are equipped for alternate use in processing and reactivation. The reactors may be of the conventional type comprising, for example, reactors in which the catalytic material is contained in relatively small diameter tubes and wherein provisions are made for introducing a fluid heat convective medium to supply heat during conversion and withdraw heat during reactivation or, on the other hand, the reactors may comprise those of the type which contain relatively shallow beds of catalytic material wherein conversion and reactivation is accomplished substantially adiabatically. In the case such as here illustrated, with two reactors the stream of reactants is introduced to one reactor simultaneously with the introduction of a stream of reactivating gases to the other reactor, and provisions are made for alternately switching the streams of reactants and reactivating gases from one reactor to the other and for switching the streams of used reactivating gases and conversion products. Switching of the various streams may be accomplished by any of the well known methods such as, for example, by means of automatically operated two-way valves, but for the purpose of this invention I have shown the switching valves as comprising four-way valves containing two passageways which may be switched from the position illustrated in Fig. 2 to that illustrated in Fig. 2A and vice versa.

Hydrocarbon reactants to be converted in the process comprising, for example, a hydrocarbon oil amenable to catalytic cracking are supplied through line 1 to valve V1. With reactor A on process valve V1 which controls the direction of flow of the reactants and fresh reactivating gases is adjusted to the position illustrated in Fig. 2 while valve V2 which controls the direction of flow of the reactants and used reactivating gases is adjusted to the position illustrated in Fig 2A. Hydrocarbon reactants in line 1 therefor pass through valve V1 into line 2 by means of which they are supplied to reactor A. The conversion products leaving reactor A are directed through line 3 to valve V2 wherethrough they pass into line 4 by means of which they may be conducted to suitable separating and collecting equipment or subjected to any desired further treatment. With reactor B on process valve V1 is adjusted to the position illustrated in Fig. 2A and valve V2 to the position illustrated in Fig. 2 whereupon hydrocarbon reactants in line 1 pass through valve V1 into line 5 by means of which they are supplied to reactor B. The conversion products leaving reactor B are directed through line 6 to valve V2 wherethrough they pass into line 4 and are thereafter subjected to treatment in the manner previously described.

When reactor A is on process and the catalytic material in reactor B is undergoing reactivation valve V3 may be adjusted to the position illustrated in Fig. 2 in which case fresh reactivating gases comprising, for example, combustion gases containing controlled minor amounts of oxygen supplied by way of line 7 are directed through valve V3 into line 8, pass through valve V1 into line 5, and thence into reactor B. Combustion products and used reactivating gases leaving reactor B are directed through line 6 to valve V2 wherethrough they pass into line 9, thence through valve V3 into line 10 and, when desired, a portion thereof may be cooled, the oxygen replenished, and this portion returned as the fresh reactivating gases or the whole or a part may be disposed of in any desired manner.

After reactivation has been substantially completed in reactor B as evidenced by a drop in the peak reactivating temperature or as shown by an oxygen analysis of the used reactivating gases (i. e., when no more oxygen is consumed in the reaction), valve V3 may be switched to the position illustrated in Fig. 2A and preferably also the oxygen supply is stopped whereupon the gases in line 7 containing substantially no or only a relatively small proportion of oxygen pass through valve V3 into line 9, thence through valve V2 into line 6 by means of which they are introduced into the lower portion of reactor B and pass therethrough opposite to the direction in which the reactivating gases flowed while reactivation was being accomplished. In this manner, heat which has accumulated in the lower portion of the bed of catalytic material in reactor B is dispersed throughout the other portions of the bed and the entire bed is brought to a substantially uniform temperature throughout. The reactivating gases introduced into the lower portion of reactor B are withdrawn therefrom by way of line 5, pass through valve V1 into line 8, thence through valve V3 into line 10, the treatment being substantially as described. However, in this case, the used gases are returned to the reactor and there is no need for the introduction of oxygen as above mentioned.

With reactor B on process the catalytic material in reactor A is undergoing reactivation and valves V1 and V2 are adjusted to the positions previously mentioned while valve V3 is adjusted to the position illustrated in Fig. 2. In this case, fresh reactivating gases in line 7 containing a controlled minor amount of oxygen are directed through valve V3 into line 8, thence through valve V1 into line 2 by means of which they are supplied to reactor A. Used reactivating gases leaving reactor A are directed through line 3 to valve V2 wherethrough they pass into line 9, thence through valve V3 into line 10, the flow thereafter being substantially as described. In this case, also, when reactivation has been substantially accomplished in reactor A valve V3 is switched to the position illustrated in Fig. 2A whereupon fresh reactivating gases in line 7, preferably containing substantially no oxygen, pass through valve V3 into line 9, thence through valve V2 into line 3 by means of which they are introduced into the lower portion of reactor A. These reactivating gases in passing through reactor A disperse the heat accumulated at the lower portion thereof throughout substantially the whole of the catalyst bed and the gases leaving this reactor are directed through line 2 to valve V1 wherethrough they pass into line 8, thence through valve V3 into line 10, after which they may be disposed of or used in any desired manner as above mentioned.

The following is an example of what may be accomplished in conducting the reactivation of a bed of used silica-alumina catalyst as above described.

A bed of silica-alumina catalyst approximately 2 feet in thickness is reactivated by passing a stream of reactivating gases heated to a temperature of approximately 850° F. and containing approximately 2% oxygen in contact therewith. Peak reactivating temperatures in this operation are preferably controlled so that they do not exceed approximately 1300° F. After reactivation is substantially complete, as evidenced by a rather rapid drop in temperature from the peak reactivating temperature of say 1300° F. to about 1100° F., the temperature at the inlet of the catalyst bed was approximately 870° F., that at the middle approximately 900° F., as above mentioned, and that at the outlet 1100° F. In accordance with the objects of the invention, the direction of flow of reactivating gases was reversed and after approximately 5 minutes the temperature difference from top to bottom was not more than 20° with a mean average temperature of approximately 930° F.

It is understood that my invention is broadly concerned with a method of obtaining an equal distribution of heat and an even temperature as near as possible equal to that desired for the reaction, throughout the catalyst bed after reactivation but prior to its use as a reacting catalyst. While I have more specifically described my invention in connection with a process in which the flow of reactivating gas is reversed for the purpose set forth above, it should be understood that a substantially inert gas from any source may be substituted for the reactivating gas for the purpose of distributing heat in the catalyst bed. The substituted gas is preferably preheated and used in an amount sufficient to obviate long conditioning periods.

I claim as my invention:

1. In a catalytic conversion process employing beds of catalytic material alternately processed and reactivated, reactivation being accomplished by passing a heated stream of oxygen-containing reactivating gases in contact with said beds to burn therefrom carbonaceous substances deposited during a prior processing period, the improvement which comprises stopping the flow of reactivating gases after reactivation is substantially completed and passing a stream of substantially inert gases opposite to the direction of flow of said reactivating gases for a time period sufficient to substantially uniformly distribute heat accumulated at the outlet of said bed through other portions thereof.

2. In a catalytic conversion process employing beds of catalytic material alternately processed and reactivated, reactivation being accomplished by passing a heated stream of reactivating gases containing controlled minor amounts of oxygen in contact with said beds to burn therefrom carbonaceous substances deposited during a prior processing period, the improvement which comprises stopping the injection of oxygen in said reactivating gas after reactivation is substantially completed and passing the substantially oxygen-free gases in contact with the bed of catalyst in a direction opposite to that of said reactivating gas for a period of time sufficient to substantially uniformly distribute heat accumulated at the outlet of said bed through other portions thereof.

3. In a catalytic conversion process wherein a stream of hydrocarbon reactants heated to a desired conversion temperature is passed in contact with a bed of catalytic material capable of effecting conversion while passing a stream of oxygen-containing reactivating gases in contact with a similar bed of catalytic material to burn therefrom carbonaceous substances deposited during a prior processing period and wherein provisions are made for alternately processing and reactivating the separate beds of catalytic material, the improvement which comprises stopping the injection of oxygen in the reactivating gases charged to the bed of catalyst undergoing reactivation when reactivation is substantially completed, passing the oxygen-free gases in contact with the reactivated bed in a direction opposite to the direction of flow of said reactivating gases and for a period of time sufficient to substantially uniformly distribute heat accumulated at the outlet of the bed through other portions thereof.

JEAN DELATTRE SEGUY.